United States Patent [19]

Schuchardt

[11] Patent Number: 4,970,005

[45] Date of Patent: Nov. 13, 1990

[54] METHOD FOR TREATMENT OF WASTEWATER CONTAINING POLYETHER POLYOLS

[75] Inventor: Jonathan L. Schuchardt, Exton, Pa.

[73] Assignee: Arco Chemical Technology, Inc., Wilmington, Del.

[21] Appl. No.: 531,730

[22] Filed: Jun. 1, 1990

[51] Int. Cl.$^5$ .............................. C02F 1/72; C02F 1/78
[52] U.S. Cl. .................................... 210/759; 210/758; 210/760; 210/763; 525/409; 525/50
[58] Field of Search ............... 210/758, 759, 760, 761, 210/762, 763, 631; 525/409, 50

[56] References Cited

U.S. PATENT DOCUMENTS

| | | | |
|---|---|---|---|
| 3,240,737 | 3/1966 | McKennon | 210/758 |
| 3,823,088 | 7/1974 | Box et al. | 210/63 |
| 4,000,065 | 12/1976 | Ladha et al. | 210/652 |
| 4,072,608 | 2/1978 | Farha et al. | 210/63 R |
| 4,200,704 | 4/1980 | Stanley et al. | 525/409 |
| 4,624,792 | 11/1986 | Yamanaka et al. | 210/763 |
| 4,877,558 | 10/1989 | Morioka et al. | 210/763 |

FOREIGN PATENT DOCUMENTS

WO89/08079  8/1989  PCT Int'l Appl. ................. 210/763

OTHER PUBLICATIONS

Ind. Eng. Chem. Res., 27 (4) 718, (1988), (Imamura et al.).
Bull. Chem. Soc. Jpn., 54 (5) 1548, (1981), Imamura et al.).
Ind. Eng. Chem. Prod. Res. Dev., 25 (1) 34, (1986), (Imamura et al.).
PPM, 11 (7) 20, (1980), (Hagiwara); Chem. Abstracts, 94 213735w.
Osaka Kogyo Gij. Shik. Kiho, 32 (4) 239, (1981), (Hagiwara et al.); Chem. Abstracts, 96 109583a.
Kagaku Kojo, 20 (12) 91, (1976), (Hagiwara et al.), Chem. Abstracts, 89 79634d.
[Kankyo Gijutsu, 10 (5) 398, (1981), Chem. Abstracts, 95 6742w].
[Mitzu Shori Gijutsu, 19 (10) 901, (1978), Chem. Abstracts, 91 44034x].
Suzuki et al., [J. Appl. Polym. Sci., 23 (11) 3281, (1979)].
Inoue et al., [Ind. Eng. Chem. Res., 28, (1989), 894].
Weber et al., [Environ. Sci. Technol., 20 970, (1986)].

*Primary Examiner*—Peter Hruskoci
*Assistant Examiner*—Neil M. McCarthy
*Attorney, Agent, or Firm*—Jonathan L. Schuchardt

[57] ABSTRACT

A method of treating wastewater containing water-insoluble high molecular weight polyether polyol impurities is disclosed. The method comprises reacting the aqueous waste stream with an oxidizing agent and optionally with a transition metal catalyst. The molecular weight of the polyol impurities is reduced to less than about 1,000, thereby improving the biodegradability of the stream.

20 Claims, No Drawings

METHOD FOR TREATMENT OF WASTEWATER CONTAINING POLYETHER POLYOLS

FIELD OF THE INVENTION

The invention relates to a method for treating wastewater to reduce the molecular weight of water-insoluble high molecular weight polyether polyol impurities present therein, and thereby improve biodegradability. The method comprises treating the polyol-contaminated aqueous stream with an oxidizing agent and optionally with a transition metal catalyst.

BACKGROUND OF THE INVENTION

Polyether polyols are typically synthesized by polymerization of one or more alkylene oxides in the presence of an alkali metal catalyst, such as potassium hydroxide, and a hydroxyl-containing initiator, such as glycerin. Following polymerization, the alkali metal catalyst residue is routinely removed from the polyether polyol by any of a number of methods, including adsorption onto magnesium silicate, or extraction of the alkali metal into water. The water wash generated in the latter process typically contains traces of organic solvent and polyether polyol in addition to the alkali metal catalyst. The pH of this stream is usually greater than 7.

The wastewater stream described above presents a unique treatment problem that is difficult to solve with conventional water treatment solutions. Organic impurities are traditionally removed from wastewater in many different ways, including membrane separation, adsorption, biodegradation, wet chemical oxidation, or a combination of methods. These methods are generally effective for erradicating low molecular weight impurities such as chlorinated hydrocarbons and phenolics. Most of the methods, however, are ineffective for treating wastewater derived from polyol synthesis processes. Polyols containing recurring oxypropylene and-/or oxyethylene repeat units, especially those of high molecular weight, are not readily biodegradable. The polyols are often substantially water insoluble, especially those with relatively low oxyethylene content, but they are readily emulsified or suspended in the aqueous stream and are therefore difficult to separate. Wet chemical oxidation of polyether polyol-containing wastewater has not been an economically attractive option for treatment of such wastes, largely due to the fact that the waste streams are very dilute, and concentration is energy intensive.

The primary method of disposal of polyether polyol aqueous waste streams is currently deep-well injection. Since polyols do not biodegrade readily, there is concern that polyols disposed of in deep wells may tend to accumulate. The ecological consequences of such accumulation are unknown. It is reasonable to assume that government regulations concerning the volumes of wastes allowed in deep wells will continue to become more strict. There is a need to find alternative means for treating wastewater.

In Box et al U.S. Pat. Nos. 3,823,088 and 4,072,608, teach wet oxidation processes catalyzed by zinc orthotitanate or zinc aluminate and promoters for treating wastewater contaminated with organic compounds. The organics treated consisted of paraffins, olefins, aromatics, and numerous oxygenated compounds. Oxidation of polyether polyol-containing wastewater is not taught.

Imamura et al. (Ind. Eng. Chem. Res. 27 (4) 718 (1988)) teach a method of oxidizing water-soluble organic compounds, including polyethylene glycol (200 mol. wt.) and polypropylene glycol (1,000 mol. wt.), using a catalyst of ruthenium supported on cerium(IV) oxides. Imamura et al. also teach (Bull. Chem. Soc. Jpn. 54 (5) 1548 (1981)) wet oxidation of water-soluble polymers to greatly improve biodegradability, and wet oxidation of polyethylene glycol using a manganese/cerium composite oxide (Ind. Eng. Chem. Prod. Res. Dev. 25 (1) 34 (1986)). Oxidation of water-insoluble polyether polyols or high molecular weight polyether polyols is not taught.

Hagiwara, et al teach methods of oxidation of wastewater containing water-soluble detergents and surfactants, including polyoxyethylene nonyl phenyl ether and polyethylene glycol (Chem. Abstr. 94 213735w, Chem. Abstr. 96 109583a, Chem. Abstr. 89 79634d). Treatment of wastewater containing water-insoluble polyether polyols is not taught.

Wet oxidation methods for treatment of wastewater containing polyether polyols represent an environmentally acceptable alternative to deep-well injection of these wastes. There is a need for oxidation methods that are effective for degrading substantially water-insoluble and high molecular weight polyether polyol impurities. Methods capable of degrading polyether polyols containing mostly oxypropylene units are needed. Methods capable of degrading polyether polyol impurities in the 2,000 to 20,000 molecular weight range to molecular weights substantially below 1,000 are needed. Since a major proportion of commercially important polyether polyols have molecular weights from about 2,000 to 6,000, methods for degrading these are especially needed.

SUMMARY OF THE INVENTION

The present invention provides a wet oxidation method for treating wastewater containing substantially water-insoluble polyether polyol impurities. More specifically, the method comprises treating an aqueous stream containing a polyether polyol having a number average molecular weight of between about 2,000 and 20,000 with an oxidizing agent and optionally with a transition metal catalyst at a temperature and for a time sufficient to degrade the polyether polyol to a number average molecular weight of less than about 1,000.

The oxidizing agents employed in the process of the invention are preferrably air, oxygen, ozone, hydrogen peroxide, and organic peroxides. Transition metal catalysts, especially those which include copper, iron, cobalt, manganese, or zinc, may optionally be included to accelerate polyol degradation.

The high molecular weight polyether polyols advantageously treated according to the process of the invention typically comprise a major proportion of recurring oxypropylene units, and are thus substantially insoluble in water. The method allows for degradation of these impurities to molecular weights of less than about 1,000, and thus renders the impurities more readily biodegradable.

DETAILED DESCRIPTION OF THE INVENTION

The present invention relates to a method of treating wastewater contaminated with substantially water-insoluble polyether polyols. In general, the method comprises treating an aqueous stream containing a polyether polyol with an oxidizing agent and optionally with a transition metal catalyst to degrade the polyether polyol to lower molecular weight fragments.

The wastewater so treated may contain other impurities in addition to the polyether polyol. Typically, the wastewater is the aqueous wash obtained from a polyol synthesis process, and it contains traces of organic solvents (e.g., aromatic or aliphatic hydrocarbons), polyether polyols, and soluble catalyst residues. The organic solvent and polyether polyols are typically insoluble in water, but when present in small proportion compared with the amount of water, they become greatly dispersed, and for practical purposes, they are physically inseparable from the water by conventional means. Additionally, the polyether polyols often have surface active properties that promote dispersal of the organic materials in the wastewater. Due to the presence of alkali metal hydroxide catalyst residues, the wastewater typically will have a pH greater than 7, and more typically within the range of about 10-12. Although the method of the invention is well suited for treatment of the polyol process wastewater described above, any aqueous stream that contains low levels of polyether polyols may be treated accordingly. Thus, neutral or acidic wastewaters may also be treated.

The polyether polyol contaminants degraded according to the method of the invention may be of any number average molecular weight within the range of about 2,000 to 20,000. The polyether polyols are normally comprised of an initiator moiety (e.g., glycerin, trimethylolpropane, propylene glycol, sucrose), which governs the functionality of the polyol, and any number of recurring oxyalkylene units, which comprise the remainder of the polyol. The polyether polyols typically have between 2 and 8 hydroxyl end groups. Typical oxyalkylene units include oxyethylene, oxypropylene, oxybutylene, and the like, and combinations thereof. The hydroxyl numbers of the polyether polyols treated in the invention range from about 5 to 500 mg KOH/g.

The polyether polyols most advantageously treated in accordance with the invention are substantially insoluble in water. In general, these polyether polyols will have low functionality (2 or 3), high molecular weight (greater than 3,000), and a large proportion of hydrophobic oxyalkylene units (oxypropylene or oxybutylene) compared with the proportion of hydrophilic (oxyethylene) units.

The oxidizing agents employed in the process of the invention may be air, oxygen, ozone, hydrogen peroxide, and organic peroxides. Any suitable means for introducing the oxidizing agent into the aqueous stream may be employed. Gaseous oxidants such as air, oxygen, or ozone may be conveniently purged through or injected into the aqueous stream. Hydrogen peroxide and organic peroxides may be added in one or more portions, or may be added continuously throughout the treatment period. The organic peroxides that may be employed in the process of the invention include, but are not limited to tert-butyl hydroperoxide, cumene hydroperoxide, and the like. The amount of oxidizing agent required will depend on many factors, including the concentration of organic material (including polyether polyol) in the wastewater, the types of compounds to be oxidized, the reaction temperature and pressure, and the identity of the oxidizing agent. The process may be carried out batchwise or continuously as desired.

The transition metal compounds optionally included in the process of the invention contain a metal selected from the group consisting of copper, iron, cobalt, manganese, and zinc. The effectiveness of the transition metal catalyst will depend on a number of factors, the most important of which are the ligands on the catalyst, the identity of the oxidizing agent, and the amount of catalyst employed. Typical examples of such catalysts include, but are not limited to, ferric and ferrous halides, cuprous and cupric halides, copper sulfate, zinc acetonylacetonate, cobalt halides, and cobalt acetonylacetonate.

The wastewater treatment method described herein may be used at, above, or below atmospheric pressure. Preferred pressures are atmospheric and above atmospheric. Thus, the treatment can be carried out in glassware, a pressurized containment vessel, a heated pipe, or even an open lagoon or treatment pond.

The temperature at which the process of the invention is carried out is preferably in the range of about 0° C. to 300° C. Usually the degradation will be accelerated at higher temperatures. A particularly preferred temperature range is 60° C. to 100° C. The reaction time may be only minutes, or may be days, depending on how severe the reaction conditions are. Generally speaking, the reaction time is the time sufficient to degrade the polyether polyol to an acceptable molecular weight range, usually to a number average molecular weight below about 1,000. The following examples are meant to illustrate, without limiting, the invention.

EXAMPLES 1-14

Wastewater Treatment with tert-Butyl Hydroperoxide (TBHP)

A typical wastewater stream was prepared from water (1600 parts), toluene (4.3 parts), potassium hydroxide pellets (4.8 parts), and "THANOL SF-5505," a 5000 molecular weight polyether triol having mostly recurring oxypropylene units. A 400-mL portion of the wastewater was heated in a 3-neck round bottom flask at atmospheric pressure with the amounts of tert-butyl hydroperoxide and, optionally, cobalt or iron acetonylacetonate as indicated in Table 1. Examples 1 and 6 were comparative examples with no oxidizing agent or catalyst included. Each reaction mixture was heated and stirred at room or elevated temperature for the time indicated, then stripped of solvent using a rotary evaporator, extracted into ether or hexanes/ethyl acetate (8:2), dried over anhydrous magnesium sulfate, and stripped prior to gel permeation chromatography (GPC) analysis. (A Waters gel permeation chromatograph equipped with a refractive index detector was used. Samples were run against polypropylene glycol standards.)

The GPC traces of the polyols recovered in comparative examples 1 and 6 were virtually identical to traces recorded for an untreated sample of SF-5505 polyol. Table 1 lists the number average molecular weight (Mn), the polydispersity (Mw/Mn), and the peak molecular weight(s) observed. Samples that were substantially degraded by the treatment had a large proportion of product having molecular weight of around 1,000 or less (Peak 2 only), while samples that were substantially unchanged by the treatment had only one peak (Peak 1) at around 5,000 molecular weight. Some samples had bimodal distributions (Peak 1 and 2 present), indicating partial degradation.

The results point to substantial polyol degradation at 100° C. within 2 hours at TBHP levels as low as 0.7 weight percent. (Example 2). The process is accelerated either by increasing the level of oxidizing agent to 2.1 percent (Example 4), or by including a transition metal catalyst such as cobalt acetonylacetonate (Example 3). Decreasing the level of TBHP and the treatment temperature generally decreased the level of effectiveness of the method (Examples 9–12). Examples 13 and 14 illustrate the possibility of room temperature treatment methods over longer periods of time—the kind of treatment technique suitable for use in a treatment pond.

It is important to note that the polyol used (SF-5505) contained a free-radical inhibitor (2,6-di-t-butyl-4-methylphenol (BHT)). It is expected that uninhibited polyols will be degraded much more easily than those used in these examples. Thus, the method of the invention is applicable to both inhibited and unihibited polyether polyols.

Example 15

Wastewater Treatment with Hydrogen Peroxide

A typical wastewater stream is prepared as in Examples 1–14. A 400-mL portion of the wastewater is heated in a 3-neck round bottom flask at atmospheric pressure with 10 mL of 30 % hydrogen peroxide and 0.1 g iron(II) chloride tetrahydrate. The mixture is heated/stirred at 100° C. Samples (100 mL) are withdrawn after 2, 4, 6, and 8 hours of heating. The aqueous samples are stripped using a rotary evaporator to reduce the total volume to about 10 mL The residue is extracted into hexanes/ethyl acetate (8:2), dried over anhydrous magnesium sulfate, and stripped. Gel permeation chromatography is expected to show substantially degraded polyol in comparison with untreated polyol, especially for the samples drawn after 6 and 8 hours of heating.

Example 16

Wastewater Treatment with Air

A 4000-mL sample of wastewater containing low levels of hexane, potassium hydroxide, and a poly(propylene oxide) triol of about 6000 molecular weight is combined with 0.5 g of copper(I) chloride and heated in a reaction kettle to 70° C. Air is sparged through the well-stirred mixture in fine bubbles at a rate of about 50 mL/second. Heating is continued for 5–6 hours. A 400-mL aliquot is withdrawn and stripped to a total volume of about 10 mL. The residue is extracted into hexanes/ethyl acetate (8:2), dried over anhydrous magnesium sulfate, and stripped. Gel permeation chromatography is expected to show substantial degradation of the polyol to lower molecular weight products.

TABLE 1

WASTEWATER TREATMENT tert-BUTYL HYDROPEROXIDE

| | Example # | | | | | | | | | | | | |
|---|---|---|---|---|---|---|---|---|---|---|---|---|---|
| | 1* | 2 | 3 | 4 | 5 | 6* | 7 | 8 | 9 | 10 | 11 | 12 | 13 | 14 |
| TBHP (wt. %) | 0 | 0.7 | 0.7 | 2.1 | 2.1 | 0 | 2.1 | 0.7 | 0.07 | 0.14 | 0.14 | 0.07 | 0.70 | 0.70 |
| Co(acac)$_2$[1] (mg) | 0 | 0 | 10 | 0 | 10 | 10 | 0 | 0 | 0 | 0 | 10 | 10 | 0 | 10 |
| Fe(acac)$_3$[2] (mg) | 0 | 0 | 0 | 0 | 0 | 0 | 0 | 15 | 0 | 0 | 0 | 0 | 0 | 0 |
| Temp. (°C.) | 100 | 100 | 100 | 100 | 100 | 100 | 100 | 100 | 60 | 60 | 80 | 60 | 25 | 25 |
| Time (hours) | 2 | 2 | 2 | 2 | 2 | 2 | 8 | 2 | 2 | 2 | 2 | 2 | 30 days | 30 days |
| GPC ANALYSIS | | | | | | | | | | | | | | |
| Mn | 3680 | 1190 | 830 | 740 | 520 | 3540 | 350 | 1890 | 3720 | 3650 | 2910 | 3740 | 2050 | 1850 |
| Mw/Mn | 1.30 | 1.99 | 1.74 | 1.70 | 1.41 | 1.32 | 1.19 | 1.71 | 1.33 | 1.34 | 1.55 | 1.31 | 1.93 | 1.83 |
| Peak 1 | 5230 | 3750 | — | — | — | 4900 | — | 5470 | 5350 | 5040 | 5350 | 5220 | 5440 | 4780 |
| Peak 2 | — | 1000 | 770 | 670 | 520 | — | 390 | 1260 | — | — | — | — | 1220 | 1100 |

*Blank experiments
[1]cobalt acetonylacetonate
[2]iron acetonylacetonate

I claim:

1. A method of enhancing the biodegradability of an aqueous stream containing a polyether polyol comprising:

treating an aqueous stream containing a substantially water-insoluble polyether polyol having a number average molecular weight of between about 2,000 and 20,000 with an oxidizing agent at a temperature and for a time sufficient to reduce the number average molecular weight of the polyether polyol to less than about 1,000, thereby rendering the stream more biodegradable than in the absence of the treatment.

2. The method of claim 1 wherein the oxidizing agent is selected from the group consisting of air, oxygen, ozone, hydrogen peroxide, and organic peroxides.

3. The method of claim 1 wherein the aqueous stream is treated in the presence of a transition metal compound containing a metal selected from the group consisting of copper, iron, cobalt, manganese, and zinc.

4. The method of claim 1 wherein the polyether polyol has between 2 and 8 hydroxyl end groups and contains recurring units selected from the group consisting of one or more of oxyethylene, oxypropylene, and oxybutylene.

5. The method of claim 4 wherein the polyether polyol is a copolymer of ethylene oxide and propylene oxide.

6. The method of claim 4 wherein the polyether polyol is a poly(oxypropylene) polyol.

7. A method of enhancing the biodegradability of an aqueous stream containing a polyether polyol comprising:

treating an aqueous stream having a pH greater than 7 and containing a substantially water-insoluble polyether polyol having a number average molecular weight between about 2,000 and 20,000 and being comprised of recurring oxypropylene units with an oxidizing agent for a time and at a temperature sufficient to reduce the number average molecular weight of the polyether polyol to less than about 1,000, thereby rendering the stream more biodegradable than in the absence of the treatment.

8. The method of claim 7 wherein the polyether polyol has a number average molecular weight prior to treatment between about 3,000 and 10,000.

9. The method of claim 7 wherein the oxidizing agent is selected from the group consisting of air, oxygen, ozone, hydrogen peroxide, and organic peroxides.

10. The method of claim 7 wherein the aqueous stream is treated in the presence of a transition metal compound containing a metal selected from the group consisting of copper, iron, cobalt, manganese, and zinc.

11. A method of enhancing the biodegradability of an aqueous stream containing a polyether polyol comprising:

treating an aqueous stream having a pH greater than 7 and containing a substantially water-insoluble polyether polyol having a hydroxyl number of between about 15 and 500 mg KOH/g and being comprised of recurring oxypropylene units with hydrogen peroxide at a temperature between about 20° C. and 100° C. for a time sufficient to reduce the number average molecular weight of the polyol to less than about 1,000, thereby rendering the stream more biodegradable than in the absence of the treatment.

12. The method of claim 11 wherein the aqueous stream is treated in the presence of a transition metal compound containing a metal selected from the group consisting of copper, iron, cobalt, manganese, and zinc.

13. The method of claim 11 wherein the aqueous stream has a pH between about 10 and 12.

14. The method of claim 11 wherein the aqueous stream is treated at a temperature between about 60° C. and 100° C.

15. A method of enhancing the biodegradability of an aqueous stream containing a polyether polyol comprising:

treating an aqueous stream having a pH greater than 7 containing a substantially water-insoluble polyether polyol having a hydroxyl number of between about 15 and 500 mg KOH/g and being comprised of recurring oxypropylene units with air at a temperature and for a time sufficient to reduce the number average molecular weight of the polyol to less than about 1,000, thereby rendering the stream more biodegradable than in the absence of the treatment.

16. The method of claim 15 wherein the aqueous stream is treated in the presence of a transition metal compound containing a metal selected from the group consisting of copper, iron, cobalt, manganese, and zinc.

17. The method of claim 15 wherein the aqueous stream has a pH between about 10 and 12.

18. A method of enhancing the biodegradability of an aqueous stream containing a polyether triol comprising:

treating an aqueous stream having a pH greater than 7 containing a substantially water-insoluble polyether triol having a number average molecular weight of between 3,000 and 10,000 and being comprised of recurring oxypropylene units, with tert-butyl hydroperoxide at a temperature between about 60° C. and 120° C. for a time sufficient to reduce the number average molecular weight of the polyol to less than about 1,000, thereby rendering the stream more biodegradable than in the absence of the treatment.

19. The method of claim 18 wherein the aqueous stream is treated in the presence of a transition metal compound containing a metal selected from the group consisting of copper, iron, cobalt, manganese, and zinc.

20. The method of claim 19 wherein the transition metal compound is cobalt acetonylacetonate.

* * * * *